United States Patent
Rotithor (10) Patent No.: US 8,209,493 B2
(45) Date of Patent: Jun. 26, 2012

(54) SYSTEMS AND METHODS FOR SCHEDULING MEMORY REQUESTS DURING MEMORY THROTTLING

(75) Inventor: Hemant G. Rotithor, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 701 days.

(21) Appl. No.: 12/055,417

(22) Filed: Mar. 26, 2008

(65) Prior Publication Data

US 2009/0248976 A1   Oct. 1, 2009

(51) Int. Cl.
*G06F 12/08* (2006.01)
(52) U.S. Cl. .. 711/147; 711/113; 711/158; 711/E12.017
(58) Field of Classification Search .................. 711/158, 711/147, 113, E12.017
See application file for complete search history.

(56) References Cited

U.S. PATENT DOCUMENTS

| | | | |
|---|---|---|---|
| 7,191,088 B1 | 3/2007 | Reed et al. | |
| 7,318,130 B2 | 1/2008 | Morrow et al. | |
| 7,581,064 B1 * | 8/2009 | Zedlewski et al. | 711/118 |
| 2008/0043556 A1 | 2/2008 | Nale | |
| 2009/0019243 A1 * | 1/2009 | Hur et al. | 711/158 |
| 2009/0150893 A1 * | 6/2009 | Johnson et al. | 718/104 |

OTHER PUBLICATIONS

Zhu et al., "A Performance Comparison of DRAM Memory System Optimizations for SMT Processors," IEEE, 2005.*
International Search Report for corresponding matter P26838PCT, mailed Oct. 30, 2009.

* cited by examiner

*Primary Examiner* — Yong Choe
(74) *Attorney, Agent, or Firm* — Blakely, Sokoloff, Taylor & Zafman LLP (57) ABSTRACT

Embodiments of the invention are generally directed to systems, methods, and apparatuses for improving power/performance tradeoffs associated with multi-core memory thermal throttling algorithms. In some embodiments, the priority of shared resource allocation is changed on one or more points in a system, while the system is in dynamic random access memory (DRAM) throttling mode. This may enable the forward progress of cache bound workloads while still throttling DRAM for memory bound workloads.

25 Claims, 5 Drawing Sheets

MC request throttling arbitration

FIG. 2

Core LLC Hit rate

| LLC Request Rate | | High | Low |
|---|---|---|---|
| | High | Medium LLC Arbitration Priority | Low LLC Arbitration Priority |
| | Low | High LLC Arbitration Priority | Medium LLC Arbitration Priority |

LLC Request Throttling

FIG. 3

Core LLC Hit rate

| Core Memory BW | | High | Low |
|---|---|---|---|
| | High | Throttle Medium Tag: MC Prio 1 | Throttle most Tag: MC Prio 2 (Low) |
| | Low | Don't throttle Tag: MC Prio 0 (High) | Throttle low Tag: MC Prio 1 |

LLC Miss throttling to MC

SYSTEMS AND METHODS FOR SCHEDULING MEMORY REQUESTS DURING MEMORY THROTTLING

TECHNICAL FIELD

Embodiments of the invention generally relate to the field of integrated circuits and, more particularly, to systems, methods and apparatuses for improving power/performance tradeoffs associated with multi-core memory thermal throttling algorithms.

BACKGROUND

Modern computing systems typically include two or more processor cores (or simply, cores) integrated onto a single die. These cores may have homogenous workloads or they may have heterogeneous workloads. The term "homogenous workloads" refers to those cases when the workloads running on different cores have substantially similar demands on shared resources (e.g., last level cache, interconnects, main system memory, etc.). The term "heterogeneous workloads" refers to the case when the workloads running on different cores present significantly different demands on shared resources.

The multiple cores typically share a common collection of memory resources called main system memory. Main system memory may include a number of dynamic random access memory devices (DRAMs). The temperature of the DRAMs is a function of the usage level of the DRAMs.

Modern computing systems may include mechanisms to control the temperature of the DRAMs. For example, they may support a DRAM throttle mode (DTM) in which there is an on/off duty cycle control when the DRAM device temperature exceeds a preset safe threshold temperature. During the ON state, the memory controller applies normal scheduling algorithms to schedule requests for a specified number of clock cycles (e.g., 256 DRAM clocks). During the OFF state, the memory controller blocks (throttles) all requests to the DRAMs for a specified number of clock cycles (e.g., 256 clocks) to allow memory to cool down to a lower temperature.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of this invention are directed to a hardware technique for efficient dynamic random access memory (DRAM) thermal throttling in a multi-core system running heterogeneous workloads. In some embodiments, a multi-core system may have an integrated memory controller. In other embodiments, the multi-core system may have a discrete chipset.

A multi-core system running heterogeneous workloads may run a variety of different workloads on each core (or thread). Some of the workloads may need a large degree of DRAM memory bandwidth. Other workloads may be (substantially) either mid-level or last-level cache bound and may generate only a small DRAM bandwidth. Workloads that use a relatively large amount of memory bandwidth may increase the temperature of the DRAM devices. The term DRAM thermal throttling (or thermal throttling, or simply, throttling) refers to limiting DRAM bandwidth to control DRAM device temperature.

The conventional approach to DRAM thermal throttling includes using a DRAM throttle mode (DTM) in which there is an on/off duty cycle control. During the ON state, the memory controller applies normal scheduling algorithms to schedule requests for a specified number of clock cycles (e.g., 256 clocks). During the OFF state, the memory controller blocks (throttles) all requests to the DRAMs for a specified number of clock cycles (e.g., 256 clocks). The DTM can generate back pressure on "upstream" resources because requests collect in the various queues of the shared resources and, since requests are not being issued to the DRAMs, the requests do not make forward progress. This back pressure can eventually lead to stalls in the cores (or threads). For the purposes of this patent, the term "core" and "thread" are used interchangeably.

In principle, workloads that are cache bound can and should be allowed to make progress because they do not need lot of DRAM bandwidth. Embodiments of this invention provide more intelligence in request prioritization and throttling to enable the throttling of workloads that are heavy users of DRAM bandwidth (to get good power savings) and to allow other workloads that are cache bound to make progress (to provide a good performance tradeoff) with heterogeneous multi-core workloads.

Figure 1:
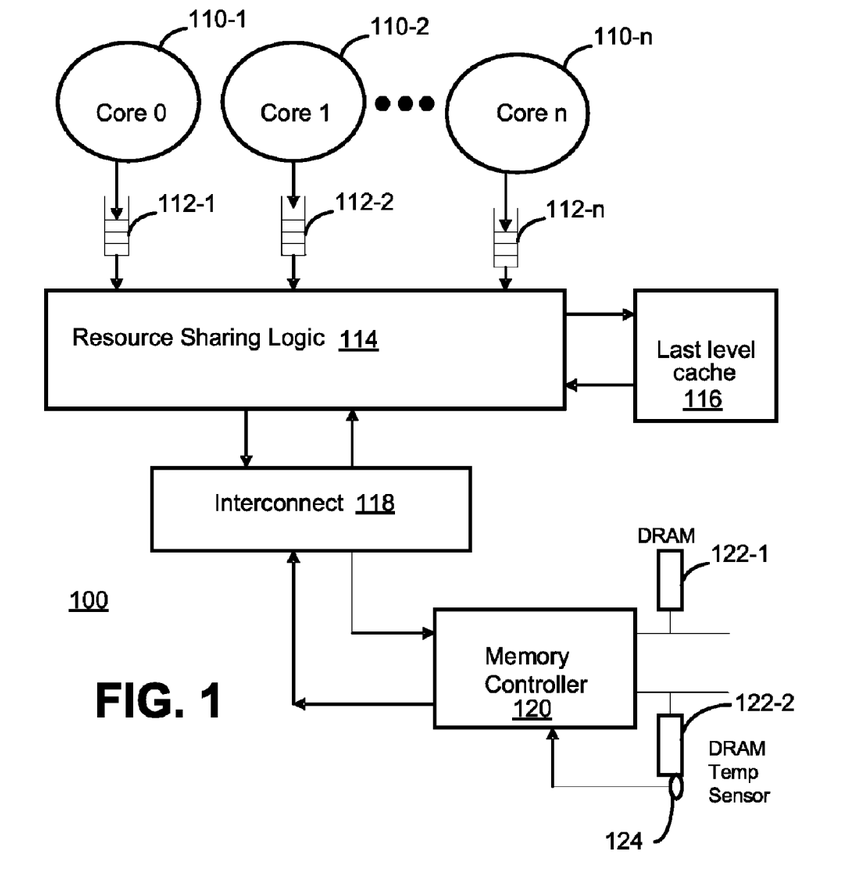
FIG. 1 is a high-level block diagram illustrating selected aspects of a multi-core computing system with a shared last level cache, implemented according to an embodiment of the invention.

FIG. 1 is a high-level block diagram illustrating selected aspects of a multi-core computing system with a shared last level cache, implemented according to an embodiment of the invention. System 100 includes a number of cores 110, resource sharing logic 114, last level cache (LLC) 116, interconnect 118, memory controller 120, and DRAMs 122. In alternative embodiments, system 100 may include more elements, fewer elements, and/or different elements. In some embodiments, cores 110, resource sharing logic 114, and memory controller 120 are located on the same integrated circuit. In alternative embodiments, cores 110 and resource sharing logic 114 are located on a first integrated circuit and memory controller 120 is located on a second integrated circuit (e.g., as part of a discrete chipset). In some alternative embodiments, each core 110 has a separate LLC (instead of a shared LLC 116) and the cores 110 share a number of resources downstream from the LLC (e.g., interconnect 118, memory controller 120, DRAM 122, and the like).

Cores 110 may be any of a wide array of processor cores including general purpose processors, graphics processors, and the like. For ease of illustration, FIG. 1 shows three processor cores. It is to be appreciated, however, that system 100 may have nearly any number of processor cores.

Each core 110 may have private first and second level caches. Cores 110 may also share LLC 116. In addition, cores 110 may share other downstream resources including, for example, interconnect 118, memory controller 120, and DRAMs 122.

In the illustrated embodiment, each core 110 is associated with an LLC request queue 112. In some embodiments, there may be a separate queue 112 for each core 110. In alternative embodiments, two or more cores 110 may share a queue 112. As is further described below, in some embodiments, the occupancy (utilization) of queues 112 is monitored to determine, for each core 110, an average occupancy over a predetermined period of time. This value may be used to determine which core 110 has priority of access to which shared resource when system 100 is in DTM.

Resource sharing logic 114 provides a number of arbitration, switching, and queuing functions. For example, resource sharing logic 114 may arbitrate access to LLC 116 and interconnect 118 for cores 110. If system 100 is not in DTM, then logic 114 may apply a conventional arbitration scheme (e.g., demand based or round robin arbitration) to control access to the shared resources. When a DTM event is signaled in the system, its occurrence indicates that threads that are heavy users of memory bandwidth can operate at a lower priority over threads that are light users of memory bandwidth and heavy users of caches so long as the system is in DTM and this information is used to control system resource allocation to make better power/performance tradeoffs. When system 100 is in DTM, however, then logic 114 may apply a pre-specified arbitration scheme that allows forward progress for cores that are primarily accessing LLC 116 (rather than main system memory) while throttling cores that are primarily accessing main system memory (e.g., DRAMs 122). In some embodiments, the pre-specified arbitration scheme is based, at least in part, on the occupancy of queues 112 for a simpler implementation. As is further discussed below, the pre-specified arbitration scheme can be enhanced by using other characteristics including per core average LLC hit rate over a preset interval, per core average memory bandwidth over a preset interval, and the like.

Interconnect 118 provides a connection between logic 114 and memory controller 120. If logic 114 and memory controller 120 are collocated on the same die, then interconnect 118 may be an on-die interconnect. Alternatively, if logic 114 and memory controller 120 are not located on the same die, then interconnect 118 may be an off-die interconnect (e.g., a bus or a point-to-point interconnect).

Memory controller 120 arbitrates among pending requests (e.g., requests forwarded to it from logic 114 via interconnect 118 after LLC miss) and sends a selected request to one of the DRAMs 122 (e.g., to read or write data). At least some of the memory devices 122 may include a temperature sensor 124. Temperature sensor 124 may be on the same die as DRAM 122 or conveniently located with respect to DRAM 122 to collect temperature data. Memory controller 120 receives input from sensors 124 and attempts to keep the temperature of DRAMs 122 within defined limits to avoid thermal runaway. If the temperature of DRAM 122 exceeds a defined limit, then memory controller 120 enters a DRAM throttle mode and starts to throttle requests to DRAM 122. In some embodiments, the DRAMs do not have sensors with an open loop DRAM thermal throttling algorithm which simply controls/throttles DRAM bandwidth when it exceeds a threshold.

In some embodiments, when system 100 is in DTM, a pre-specified scheduling policy is applied to requests from cores 110. This pre-specified scheduling policy works in conjunction with the on/off duty cycle of the DTM. During the ON cycle, the pre-specified scheduling policy determines which requests (from which core) are allowed to make progress. During the OFF cycle, requests to memory are throttled to allow DRAMs 122 to cool. In some embodiments, the pre-specified scheduling policy prioritizes requests from cores that are primarily hitting LLC 116 over those that are largely bound to DRAMs 122. Whether requests are judged to be "primarily hitting LLC 116" may be system specific. In some embodiments, a core is judged to be primarily hitting LLC 116 if at least 90% (+/−10%) of the requests that it issues over a certain interval are satisfied by LLC 116. The term "cache bound core" refers to a core that is generating requests (over the relevant time interval) that are primarily hitting cache (e.g., LLC 116). The term "DRAM bound core" refers to a core that is generating requests (over the relevant time interval) that are primarily DRAM bound 122. Such a core may have either a significant components of the requests hitting in LLC as well.

In some embodiments, the requests from cache bound cores are prioritized over the requests from DRAM bound cores at more than one point in system 100. For example, in some embodiments, the requests from cache bound cores are favored over those from DRAM bound cores during arbitration for LLC 116. This helps cache bound cores to effectively use cache resources even when memory controller 120 is throttling all of the requests to DRAMs 122 during the OFF cycle of the DTM. In some embodiments, among those requests that miss LLC 116, those from cache bound cores are favored over those from DRAM bound cores when arbitrating for access to interconnect 118 (to be forwarded to memory controller 120). In some embodiments, memory controller 120 favors requests from cache bound cores during the ON cycle of the DTM. This helps the occasional DRAM request from a cache bound core to make progress during the ON cycle of the DTM such that any requests in the core that are dependent on DRAM bound requests can make progress during OFF cycle as well.

Figure 2:
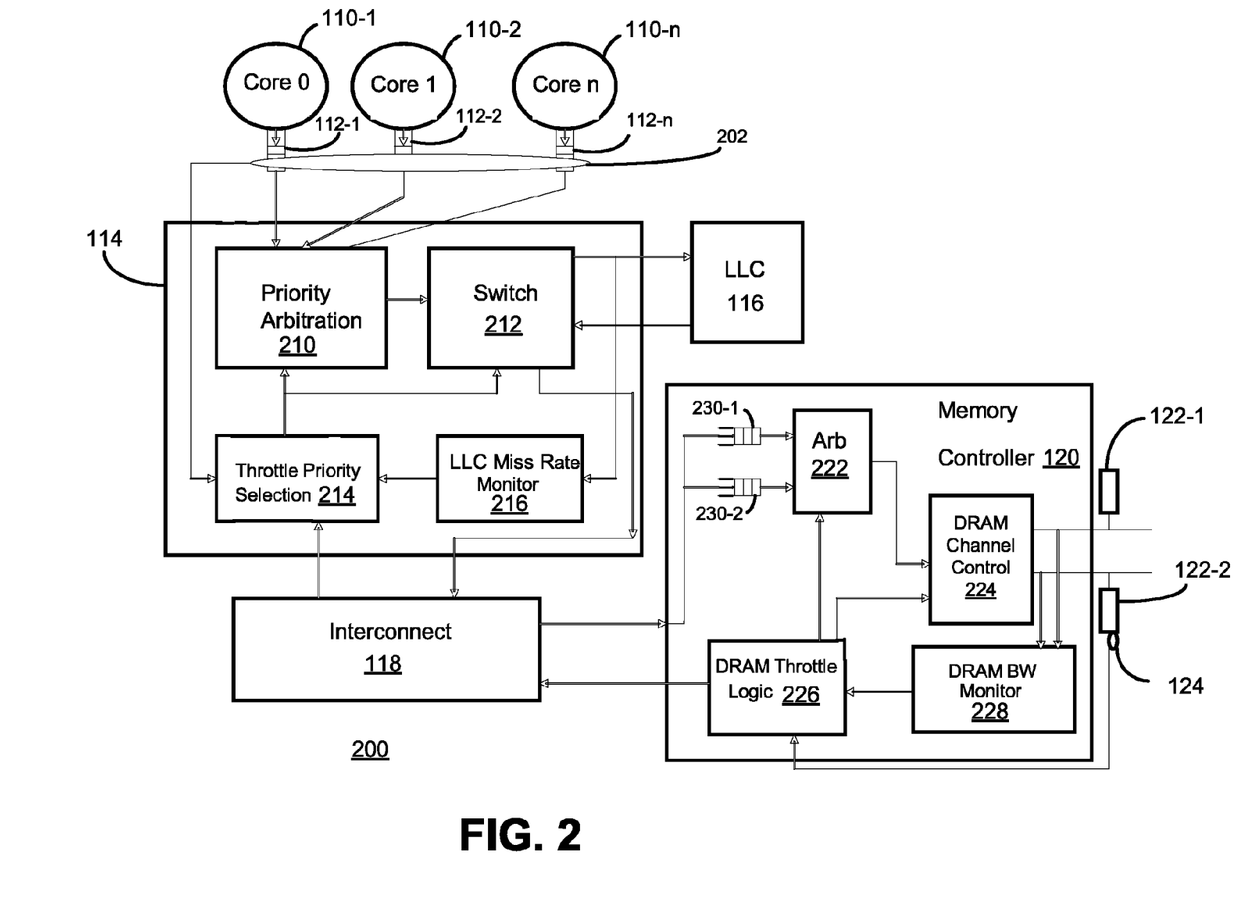
FIG. 2 is a block diagram illustrating selected aspects of a multi-core memory throttling solution, implemented according to an embodiment of the invention.

FIG. 2 is a block diagram illustrating selected aspects of a multi-core computing system with a shared last level cache, implemented according to an embodiment of the invention. A number of elements shown in FIG. 2 are substantially similar to those shown in FIG. 1 and those elements share the same reference numbers. In alternative embodiments, system 200 may include more elements, fewer elements, and/or different elements.

System 200 includes logic to implement a number of heuristics to enable request priority/arbitration decisions at various locations. Table 1 lists a number of these heuristics. In alternative embodiments, system 200 may implement more heuristics, fewer heuristics, and/or different heuristics.

TABLE 1

| Heuristic Type |
| --- |
| Per core avg LLC request occupancy over interval |
| DRAM thermal throttling on/off |
| Per core avg LLC hit rate over preset interval |
| Per core average Memory BW over interval |
| Per transaction MC request priority in DTM |

In some embodiments, the first two listed heuristics provide a first level of power/performance tradeoffs. The subsequently listed heuristics provide additional and/or optional levels of power/performance tradeoffs. The listed heuristics are discussed below with reference to the elements in system 200 that implement the heuristics.

Queue occupancy monitor 202 is coupled with each of the LLC request queues 112. In some embodiments, monitor 202 determines, for each core 110, an average LLC request queue occupancy over a specified interval of time. Monitor 202 provides this data to throttle priority selection logic 210 of resource sharing logic 114.

In the illustrated embodiment, logic 114 includes priority arbitration logic 210, switch 212, throttle priority selection logic 214, and LLC miss rate monitor 216. Switch 212 provides switching functions for LLC 116 and interconnect 118. In some embodiments, switch 212 is a multi-way crossbar switch. In alternative embodiments, switch 212 is a ring switch. LLC miss rate monitor 216 and throttle priority selection logic 214 are new elements that have been added to logic 114 to support the multi-core thermal throttling power/performance tradeoff heuristics.

LLC miss rate monitor 216 monitors the requests going to LLC 116 from each of the cores 110. In some embodiments, LLC miss rate monitor 216 includes an average LLC hit rate counter for each core. Monitor 216 may calculate, for each core, an average LLC hit rate over a specified interval. The hit rate can be quantized to finer levels based on various thresholds. In some embodiments, the hit rate is partitioned into a high hit rate and a low hit rate. This information indicates which cores are generating a lot of LLC hits and which are generating a significant number of cache misses. As is further discussed below, embodiments of the invention may use this information to determine which requests to prioritize.

Throttle priority selection logic 214 prioritizes the requests from cache bound cores 110 over DRAM bound cores 110 (e.g., if system 200 is in DTM). Logic 214 may collect various inputs from system 200 to acquire information pertinent to request and resource allocation priorities. For example, the output of LLC monitor 216 is provided to throttle priority selection logic 214. Similarly, the output of queue occupancy monitor 202 is also provided to logic 214 to provide information about the average LLC queue occupancy for each core 110. Memory controller 120 provides logic 214 an indication of whether system 200 is in DTM via interconnect 118. This indication may be sent as a message or as a separate signal depending on whether or not memory controller 120 is integrated onto the same die as resource sharing logic 114.

In some embodiments, if system 200 is not in DTM, then throttle priority selection logic 214 allows system 200 to operate in a normal way without altering any request and resource allocation priorities. If system 200 is operating in DTM, then logic 214 alters the request and resource allocation priorities using one or more heuristics. For example, in some embodiments, if system 200 is operating in DTM, then logic 214 controls two decisions.

Figure 3:
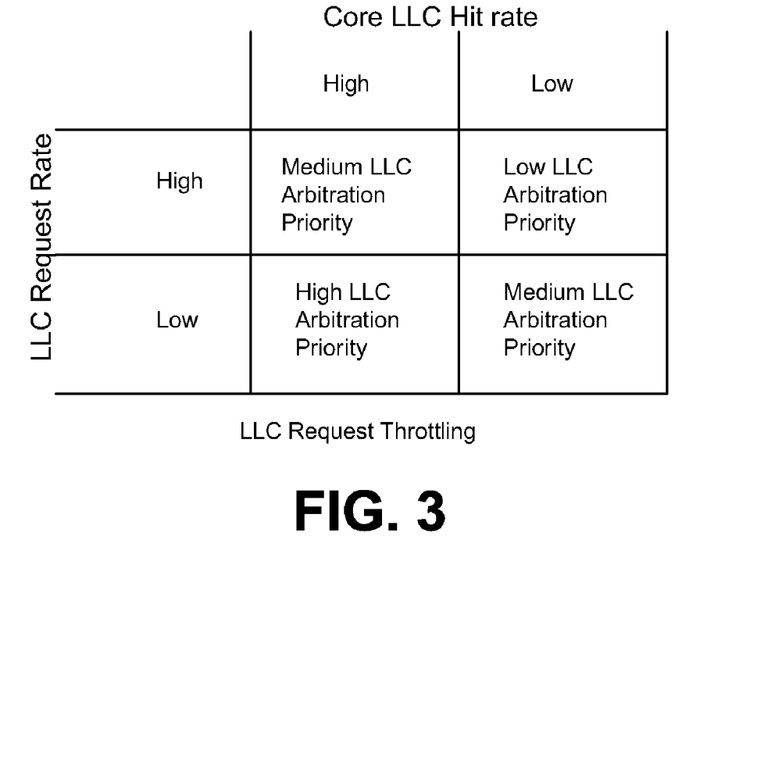
FIG. 3 is a diagram illustrating selected aspects of a heuristic for last level cache (LLC) request prioritization when a system is in throttling mode.

The first decision is the arbitration policy for LLC 116. FIG. 3 illustrates one example of a heuristic that logic 214 applies to determine the arbitration policy for LLC 116. In the illustrated heuristic, logic 214 uses the LLC request queue occupancy information (e.g., collected by monitor 202) and the LLC hit rate information (e.g., collected by monitor 216) collected for each core to prioritize the requests from each core. For example, if the average LLC request queue occupancy for a core is low and the LLC hit rate for the queue is high, then logic 214 may assign a high priority to the requests from that queue. In alternative embodiments, logic 214 may apply a different heuristic to determine the arbitration policy for LLC 116.

Figure 4:
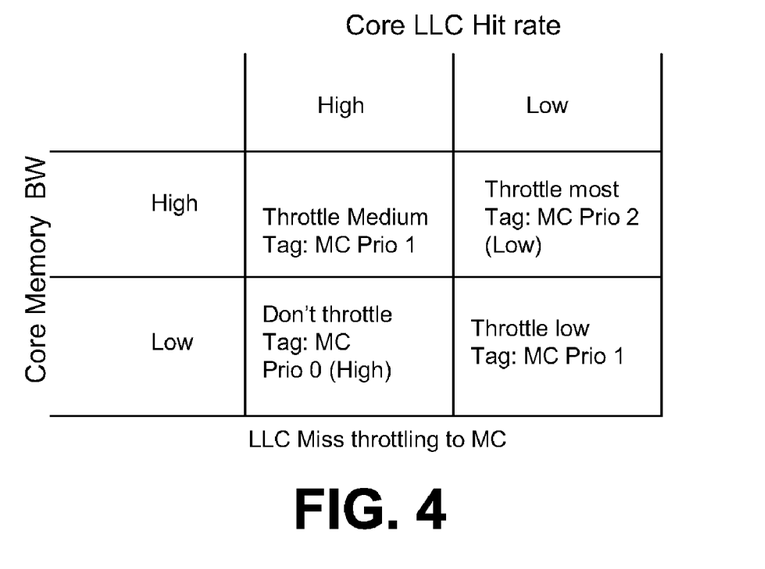
FIG. 4 is a diagram illustrating selected aspects of a heuristic for throttling LLC misses to a memory controller when a system is in DRAM throttling mode (DTM).

The second decision that logic 214 controls is the arbitration policy for switch 212 when requests miss LLC 116 and are forwarded to memory controller 120. This decision typically involves arbitrating for DRAM channel queue credits or other resources in memory controller 120 in addition to prioritizing access to the resources of switch 212. FIG. 4 illustrates one example of how logic 214 prioritizes requests that miss LLC 116. In the illustrated heuristic, logic 214 uses the LLC hit rate information (e.g., collected by monitor 216) collected for each core and the memory bandwidth information (e.g., collected by monitor 228) collected for each core to prioritize the requests from each core. In some embodiments, logic 214 assigns weighted priorities to the requests based on the heuristic illustrated in FIG. 4. For example, if a request originates from a core associated with low memory bandwidth usage and a high LLC hit rate (bottom left of FIG. 4), then logic 214 may assign a high priority tag to the request. This tag indicates to memory controller 120 that the request should be given priority when accessing DRAMs 122. Thus, requests from cache bound cores can continue to make progress even when they occasionally miss LLC 116. In alternative embodiments, logic 214 may apply a different heuristic to determine the arbitration policy for switch 212.

Memory controller 120 includes arbitrator 222, DRAM channel control logic 224, DRAM bandwidth monitor 228, and DRAM throttle logic 226. Memory controller 120 receives requests from interconnect 118 and queues them in queues 230. If system 200 is not in DTM, then arbitrator 222 may apply normal scheduling policies (e.g., that may optimize DRAM utilization) to schedule the requests in queues 230. DRAM channel control logic 224 issues the scheduled requests to DRAMs 122.

In some embodiments, memory controller 120 applies a pre-specified scheduling policy to the requests in queues 230, if system 200 is in DTM. The pre-specified scheduling policy may be designed to prioritize requests from cache bound cores over those from DRAM bound cores. Memory controller 200 includes DRAM bandwidth monitor 228 and DRAM throttle logic 226 to implement the pre-specified scheduling policy. DRAM bandwidth monitor 228 monitors the average DRAM bandwidth usage of each core over a specified interval.

DRAM throttle logic 226 receives the DRAM bandwidth usage information from block 228 as well as temperature information from sensor 124. If the temperature of DRAM 122 exceeds a threshold, then DRAM throttle logic 226 may initiate DTM. DRAM throttle logic 226 may provide an indication to logic 114 when it initiates DTM events (e.g., via a message or signal).

Figure 5:
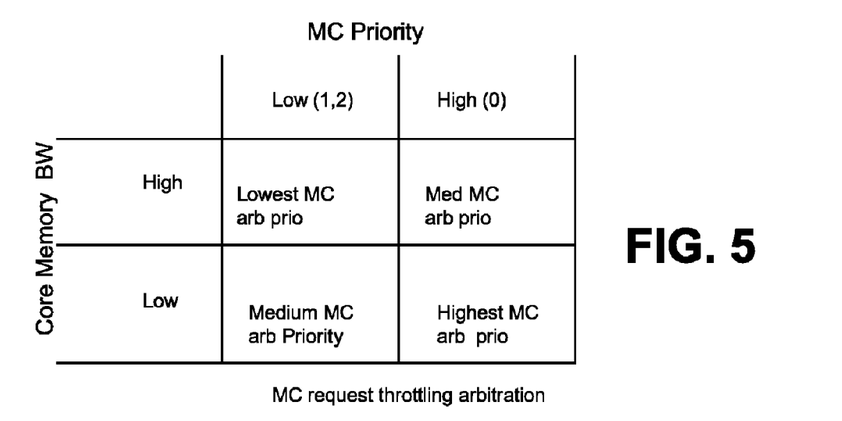
FIG. 5 is a diagram illustrating selected aspects of a heuristic for throttling access to memory when a system is in throttling mode.

FIG. 5 illustrates one example of how logic 226 prioritizes requests for the DRAMs when system 200 is operating in DTM. In the illustrated embodiment, logic 226 uses the memory bandwidth information provided by monitor 228 and the priority tags assigned by logic 214 to prioritize the requests queued in queues 230. For example, if a request is associated with a core that has a low memory bandwidth usage (over the relevant interval) and if the request is assigned a high-priority tag (e.g., lower right of FIG. 5), then logic 226 may give that request the highest priority access to DRAMs 122. In alternative embodiments, logic 226 may implement a different algorithm to prioritize requests bound for DRAMs 122.

When operating in DTM, memory controller 120 may select N requests to be sent to DRAM 122 after turning DRAM power on during the ON throttling interval. After sending the N requests, memory controller 120 turns DRAM power off and waits for M clocks to throttle memory bandwidth down. Selecting the right set of N requests to send is important to maintaining forward progress in upstream units. If it takes K cycles to turn DRAM power off and if the average DRAM access time for requests is L cycles, then K/L*N and K/M should be a small fraction so that the overhead of switching DRAM 122 on/off is kept small.

In some alternative embodiments, memory controller 120 arbitrates requests using just the tags that are assigned to the requests (e.g. if DRAM bandwidth usage information is not available). In yet other alternative embodiments, if priority tags are not implemented, then random selection may be used. This will likely drain requests from those cores that are cache bound to allow them to make forward progress potentially better than a normal scheduling algorithm that optimizes DRAM efficiency and may select memory bound core requests. In some embodiments, when memory bandwidth per core over a preset interval is measured, the interval is selected so that significant past history is kept and the interval is not dominated by requests sent during DTM alone since it will not provide desired results and will throttle requests from the wrong type of cores.

In some embodiments, additional performance benefits may be achieved using a variation of the on/off cycle policy. The variation may use three cycles rather than two. The first cycle may include sending N requests using the policy that favors cache bound threads as described above. The second cycle may include throttling the DRAM for M cycles. The third cycle may include selecting R requests to send to DRAMs 122 using a normal DRAM scheduling policy that would likely favor bandwidth intensive cores. In other alternative embodiments, a different number of cycles using a variety of scheduling policies may be used.

Figure 6:
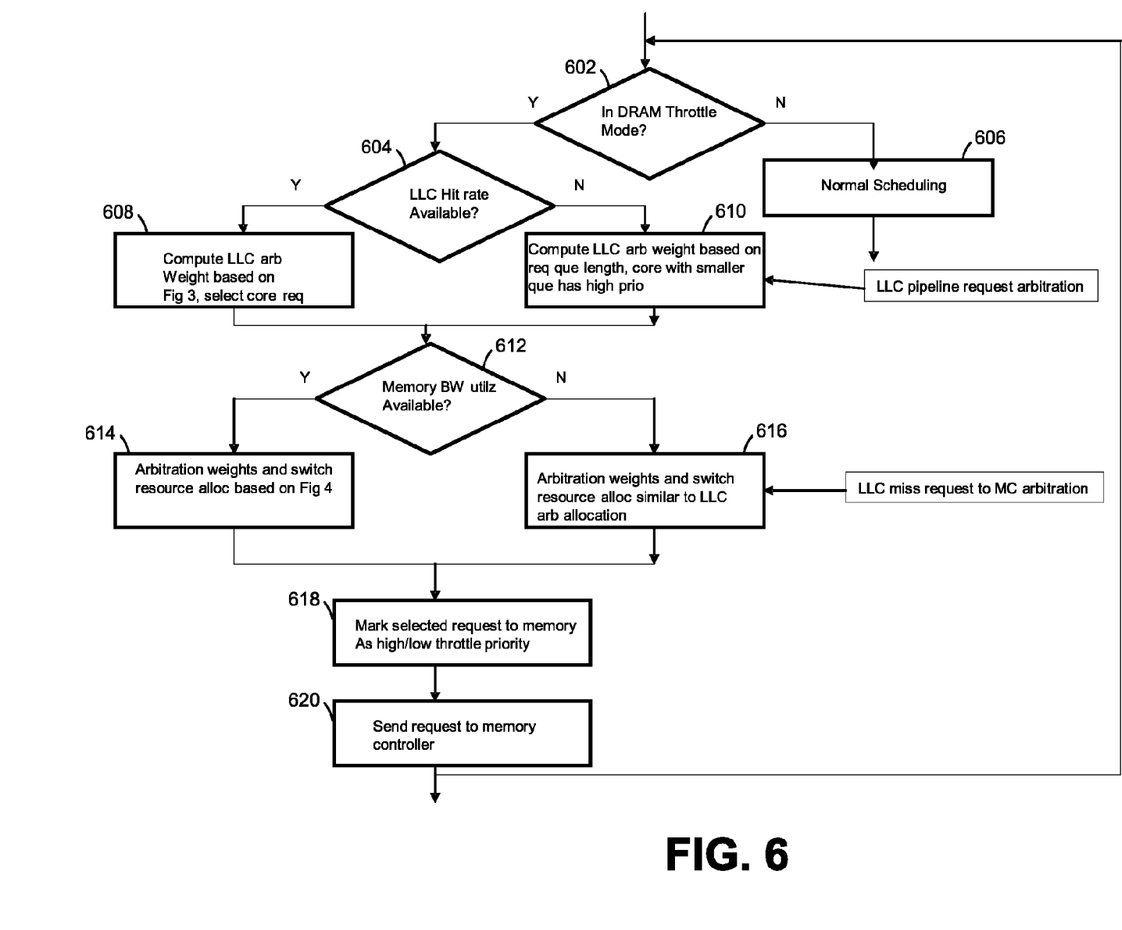
FIG. 6 is a flow diagram illustrating selected aspects of LLC and switch scheduling in memory throttling mode according to an embodiment of the invention.

FIG. 6 is a flow diagram illustrating selected aspects of LLC and switch scheduling in memory throttling mode according to an embodiment of the invention. Referring to process block 602, logic (e.g., throttle priority logic 214, shown in FIG. 2) determines whether a system is in DTM. The logic may receive an indication from an associated memory controller that system is in DTM. The indication may be a message, signal, and the like. If the system is not in DTM, then the logic may allow the system to continue to prioritize requests according to normal algorithms (at 606).

If the system is in DRAM throttling mode (DTM), then the logic determines whether an indication of LLC hit rate for each of two or more cores is available, 604. In some embodiments, the indication of LLC hit rate is provided by an miss rate monitor (e.g., miss rate monitor 216, shown in FIG. 2). If the LLC hit rate information is available, then the logic computes an LLC arbitration weight using an algorithm such as the one shown in FIG. 3 (608). If the LLC hit rate information is not available, then the logic may compute an LLC arbitration weight based on LLC request queue occupancy as shown by 610.

Referring to process block 612, the logic determines whether memory bandwidth utilization information is available for each of the two or more cores. If it is, then the logic determines priority tags for requests and arbitrates access to a switch based (at least partly) on the information according to an algorithm like the one shown in FIG. 4 (614). Otherwise, the logic may determine priority tags and arbitrate access to the switch in a manner similar to the LLC arbitration allocation (616).

Referring to process block 618, the logic assigns the priority tags to the requests that have generated LLC misses. The requests are then sent to the memory controller, 620 (e.g., memory controller 120, shown in FIG. 2).

Figure 7:
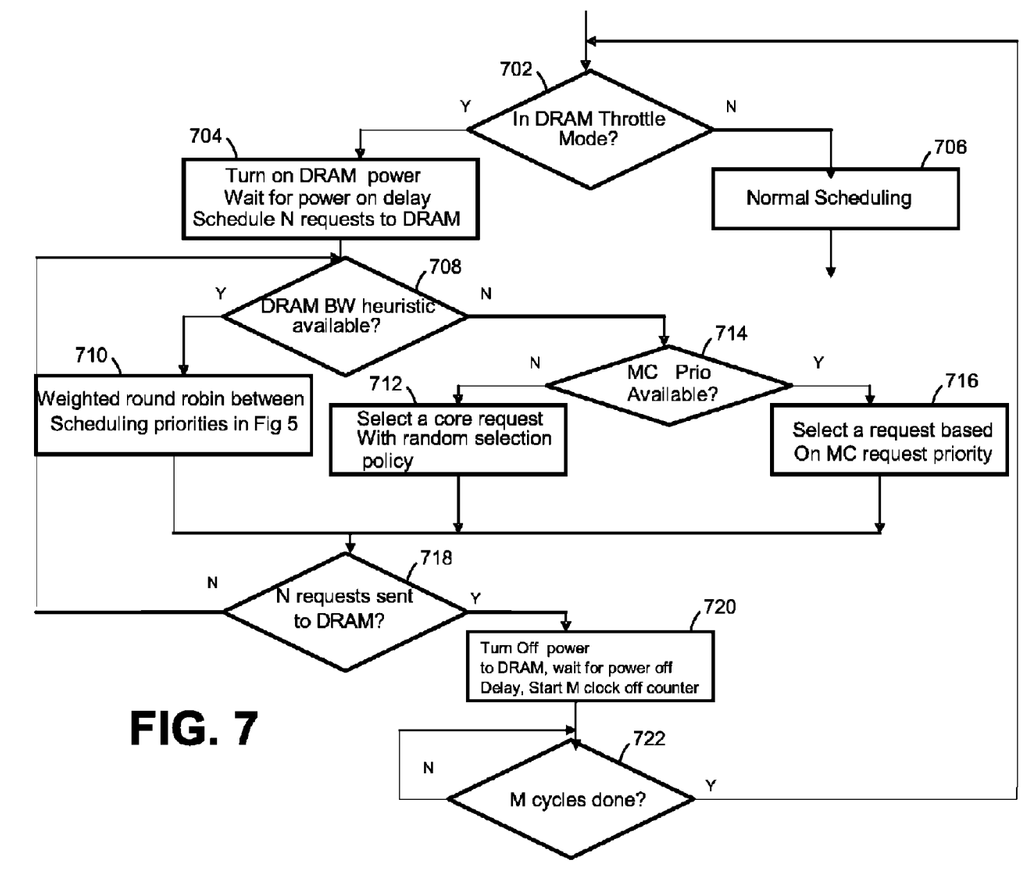
FIG. 7 is a flow diagram illustrating selected aspects of an algorithm for issuing requests to a DRAM while operating in DTM, according to an embodiment of the invention.

FIG. 7 is a flow diagram illustrating selected aspects of an algorithm for issuing requests to a DRAM while operating in DTM, according to an embodiment of the invention. Referring to process block 702, logic (e.g., DRAM throttle logic 226, shown in FIG. 2) determines whether the system is in DTM. For example, the logic may receive information from a temperature sensor (e.g., sensor 124, shown in FIG. 2) that indicates that DRAM device temperatures have exceeded a threshold. In response, the logic may initiate DTM. If the system is not in DTM, then the logic may allow a normal scheduling policy to be implemented (at 706).

If the system is in DIM, then it may start the ON state of a repeating series of on/off cycles. For example, the logic may turn on DRAM power, 704, wait for a specified power on delay, and then initiate a loop (e.g., 708-718) that may be repeated N times to select N requests to issue to the DRAM.

Referring to process block 708, the logic may determine whether a DRAM bandwidth heuristic is available (e.g., such as the one shown in FIG. 5) at 708. If the DRAM heuristic is available, then the logic may apply a weighted round robin arbitration scheme based on scheduling priorities determined by the heuristic (710). If the heuristic is not available, then the logic determines whether the requests are tagged with priority tags at 714. If the requests have priority tags, then the logic selects a request to issue to the DRAM based, at least in part, on the priority tags (716). If the requests do not have priority tags, then the logic may select a request using, for example, a random selection policy (712).

Referring to process block 718, during the ON cycle of the DTM, the logic implements a loop (as described above) to select and issue N requests. After N requests are issued to the DRAM, the logic may transition to the OFF cycle. For example, the logic may turn the DRAM power off, wait a specified delay period, and then start an M clock off counter (720). At the conclusion of M cycles, the process may return to block 702 as shown by block 722.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the description above, certain terminology is used to describe embodiments of the invention. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a microcontroller, or the like.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. A system comprising:
   two or more processor cores, each processor core associated with a queue occupancy monitor to monitor a last level cache pipeline request occupancy value for each processor core; and
   resource sharing logic coupled with the two or more processor cores, the resource sharing logic to determine a selected processor core, the selected processor core to have access to at least one resource based, at least in part, on the last level cache pipeline request occupancy value corresponding to the selected processor core; and
   a memory controller to control access to main system memory, the memory controller including dynamic random access memory (DRAM) throttle logic to determine whether the system is in DRAM throttling mode (DTM) and to provide an indication to the resource sharing logic if the system is in DRAM throttling mode, the memory controller to apply a pre-specified scheduling policy based on the occupancy value for each processor core in conjunction with the DTM to determine which requests from which cores are allowed to make progress.

2. The system of claim 1, wherein the resource sharing logic includes an input to receive an indication that a memory controller is in DRAM throttling mode and further wherein, the selected processor core is to have access to the at least one resource, if the memory controller is in DRAM throttling mode.

3. The system of claim 2, wherein the at least one resource is a shared last level cache.

4. The system of claim 3, wherein the resource sharing logic includes:
   a second monitor to monitor a per core last level cache hit rate for each of the two or more processor cores; and
   throttle priority selection logic to change priority of arbitration to access the last level cache.

5. The system of claim 4, wherein the resource sharing logic further includes switching logic to forward requests that generate a last level cache miss to a memory controller, and further wherein the throttle priority selection logic is to arbitrate access to the memory controller.

6. The system of claim 5, wherein the at least one resource is main system memory.

7. The system of claim 1, wherein the memory controller further includes:
   a DRAM bandwidth monitor coupled with the DRAM throttle logic, the DRAM bandwidth monitor to determine, for each of the two or more processor cores, a DRAM bandwidth usage value to indicate a level of DRAM bandwidth usage for a corresponding processor core.

8. The system of claim 1, wherein the two or more processor cores, the resource sharing logic and the memory controller are located on the same integrated circuit.

9. The system of claim 1, wherein the two or more processor cores and the resource sharing logic are located on a first integrated circuit and the memory controller is located on a second integrated circuit.

10. A method for controlling access to a shared resource in a system, the method comprising:
    receiving, at resource sharing logic, an indication that the system is in dynamic random access memory (DRAM) throttle mode (DTM), and, if the system is in the DTM, the resource sharing logic to apply a pre-specified scheduling policy based on an occupancy value for each processor core in conjunction with the DTM to determine which requests from which cores are allowed to make progress;
    computing, for each of the two or more processor cores coupled with the resource logic, a last level cache arbitration weight wherein the last level cache arbitration weight for each of the two or more processor cores is based, at least in part, on a last level cache request queue occupancy over a predetermined interval and last level cache hit rate for that core; and
    enabling a selected one of the two or more processor cores to access a last level cache based, at least in part, on the last level cache arbitration weights.

11. The method of claim 10, further comprising:
    computing, for each of the two or more processor cores, a last level cache hit rate; and
    tagging each of a plurality of memory requests with a priority tag wherein the priority tag for each request is based, at least in part, on a last level cache hit rate and a memory bandwidth utilization associated with a core that issued the request.

12. The method of claim 11, further comprising:
    determining, for each of the two or more processor cores, an average memory bandwidth value; and
    selecting a request to send to system memory based, at least in part, on a priority tag associated with the request and an average memory bandwidth value associated with a processor core that issued the request.

13. The method of claim 12, wherein the method is implemented in hardware.

14. A system comprising:
    an integrated circuit including,
       two or more processor cores, each processor core associated with a queue occupancy monitor to monitor a last level cache occupancy value for each processor core, and
       resource sharing logic coupled with the two or more processor cores, the resource sharing logic to determine a selected processor core, the selected processor core to have access to at least one resource based, at least in part, on the last level cache occupancy value corresponding to the selected processor core and last level cache hit rate for the core; and
    a memory controller to control access to main system memory, the memory controller including dynamic random access memory (DRAM) throttle logic to determine whether the system is in DRAM throttling mode (DTM) and to provide an indication to the resource sharing logic if the system is in DRAM throttling mode, the memory controller to apply a pre-specified scheduling policy based on the occupancy value for each processor core in conjunction with the DTM to determine which requests from which cores are allowed to make progress; and at least one DRAM device coupled with the integrated circuit to provide main system memory to the integrated circuit.

15. The system of claim 14, wherein the resource sharing logic includes an input to receive an indication that the memory controller is in DRAM throttling mode and further wherein, the selected processor core is to have access to the at least one resource, if the memory controller is in DRAM throttling mode.

16. The system of claim 15, wherein the at least one resource is a shared last level cache.

17. The system of claim 16, wherein the resource sharing logic includes:
   a second monitor to monitor a per core last level cache hit rate for each of the two or more processor cores; and
   throttle priority selection logic to change priority of arbitration to access the last level cache.

18. The system of claim 17, wherein the resource sharing logic further includes switching logic to forward requests that generate a last level cache miss to a memory controller, and further wherein the throttle priority selection logic is to arbitrate access to the memory controller.

19. The system of claim 18, wherein the at least one resource is main system memory.

20. The system of claim 14, wherein the memory controller further includes:
   a DRAM bandwidth monitor coupled with the DRAM throttle logic, the DRAM bandwidth monitor to determine, for each of the two or more processor cores, a DRAM bandwidth usage value to indicate a level of DRAM bandwidth usage for a corresponding processor core.

21. The system of claim 14, wherein the two or more processor cores, the resource sharing logic and the memory controller are located on the same integrated circuit.

22. The system of claim 14, wherein the two or more processor cores and the resource sharing logic are located on a first integrated circuit and the memory controller is located on a second integrated circuit.

23. A method comprising:
   receiving an indication of a thermal event;
   measuring shared resource utilization for each of two or more cores, responsive to receiving the indication of the thermal event, wherein the resource utilization comprises an occupancy value for each processor core; and
   dynamically reordering core priority of allocation to a shared resource based, at least in part, on the shared resource utilization of the two or more cores such that cores with high cache utilization and low dynamic random access memory (DRAM) bandwidth utilization are prioritized higher than cores with high DRAM bandwidth utilization for access to a shared resource during a DRAM throttle mode.

24. The method of claim 23, wherein measuring shared resource utilization for each of two or more cores comprises at least one of:
   measuring a last level cache pipeline request occupancy value;
   measuring a per core last level cache hit rate; and
   measuring a DRAM bandwidth usage value.

25. The method of claim 23, wherein the shared resource is DRAM.

* * * * *